(12) United States Patent
Deneroff et al.

(10) Patent No.: US 9,514,092 B2
(45) Date of Patent: Dec. 6, 2016

(54) NETWORK TOPOLOGY FOR A SCALABLE MULTIPROCESSOR SYSTEM

(71) Applicants: Martin M. Deneroff, New York, NY (US); Gregory M. Thorson, Altoona, WI (US); Randal S. Passint, Chippewa Falls, WI (US)

(72) Inventors: Martin M. Deneroff, New York, NY (US); Gregory M. Thorson, Altoona, WI (US); Randal S. Passint, Chippewa Falls, WI (US)

(73) Assignee: Silicon Graphics International Corp., Milpitas, CA (US)

( * ) Notice: Subject to any disclaimer, the term of this patent is extended or adjusted under 35 U.S.C. 154(b) by 613 days.

(21) Appl. No.: 13/873,058

(22) Filed: Apr. 29, 2013

(65) Prior Publication Data

US 2013/0246653 A1    Sep. 19, 2013

Related U.S. Application Data

(63) Continuation of application No. 12/121,941, filed on May 16, 2008, now Pat. No. 8,433,816, which is a
(Continued)

(51) Int. Cl.
*G06F 15/16* (2006.01)
*G06F 15/173* (2006.01)

(52) U.S. Cl.
CPC ... *G06F 15/17312* (2013.01); *G06F 15/17343* (2013.01); *G06F 15/17381* (2013.01)

(58) Field of Classification Search
CPC .................. G06F 15/17381; G06F 15/803
(Continued)

(56) References Cited

U.S. PATENT DOCUMENTS 4,860,201 A   8/1989 Stolfo et al.
5,113,523 A   5/1992 Colley et al.
(Continued)

FOREIGN PATENT DOCUMENTS

JP    63-172362 A    7/1988
JP    05-204876 A    8/1993
WO    WO 99-26429 A2    5/1999

OTHER PUBLICATIONS

Efe, Kemal, et al., "Congestion and fault tolerance of binary tree embeddings on hypercube", Fifth International Parallel Processing Symposium, 1991. Proceedings., IEEE, (1991), 458-463.
(Continued)

*Primary Examiner* — David Lazaro
(74) *Attorney, Agent, or Firm* — Polsinelli LLP

(57) ABSTRACT

A system and method for interconnecting a plurality of processing element nodes within a scalable multiprocessor system is provided. Each processing element node includes at least one processor and memory. A scalable interconnect network includes physical communication links interconnecting the processing element nodes in a cluster. A first set of routers in the scalable interconnect network route messages between the plurality of processing element nodes. One or more metarouters in the scalable interconnect network route messages between the first set of routers so that each one of the routers in a first cluster is connected to all other clusters through one or more metarouters.

18 Claims, 15 Drawing Sheets

Related U.S. Application Data continuation of application No. 11/295,676, filed on Dec. 6, 2005, now abandoned, which is a continuation of application No. 09/408,972, filed on Sep. 29, 1999, now Pat. No. 6,973,559.

(58) Field of Classification Search
USPC .................. 709/204, 212, 249; 712/10–12
See application file for complete search history.

(56) References Cited

U.S. PATENT DOCUMENTS

| | | | |
|---|---|---|---|
| 5,133,073 A | | 7/1992 | Jackson et al. |
| 5,187,801 A | | 2/1993 | Zenios |
| 5,263,124 A | | 11/1993 | Weaver et al. |
| 5,434,972 A | | 7/1995 | Hamlin |
| 5,471,580 A | | 11/1995 | Fukiwara et al. |
| 5,586,258 A | | 12/1996 | Conterno et al. |
| 5,625,836 A | | 4/1997 | Barker et al. |
| 5,669,008 A | | 9/1997 | Galles et al. |
| 5,740,468 A | | 4/1998 | Hirose |
| 5,794,059 A | * | 8/1998 | Barker et al. .................. 712/10 |
| 5,878,241 A | | 3/1999 | Wilkinson et al. |
| 6,041,358 A | | 3/2000 | Huang et al. |
| 6,230,252 B1 | | 5/2001 | Passint et al. |
| 6,334,177 B1 | | 12/2001 | Baumgartner et al. |
| 6,973,559 B1 | | 12/2005 | Deneroff |
| 8,433,816 B2 | | 4/2013 | Deneroff |
| 2006/0282648 A1 | | 12/2006 | Deneroff |

OTHER PUBLICATIONS

Goodman, James R., et al., "Hypertree: A Munitiprocessor Interconnection Topology", IEEE Transactions on Computers vol. C-30, No. 12, (Dec. 1991), 923-932.

Kumar, J. M., "Extended Hypercube: A Hierarchical Interconnection Network of Hypercubes", IEEE Transactions on Parallel and Distributed Systems, 3 (1), (Jan. 1992), 45-57.

Laudon, J., et al., "The SGI Origin: A ccNUMA Highly Scalable Server", Proceedings of ISCA '97, Denver, CO, (1997), 241-251.

Nishi, Hiroaki, et al., "The JUMP-1 Router Chip: A versatile router for supporting a distributed shared memory", Proceedings of the 1996 IEEE 15th Annual Int'l Phoenix Conference on Computers & Communication, Conf. 15, XP000594785, (Mar. 1996), pp. 158-164.

"Japanese Application No. 2001-526728, Office Action mailed Aug. 26, 2008", OAR-Misc, 1 pg.

U.S. Appl. No. 09/408,972 Final Office Action mailed Oct. 19, 2004.

U.S. Appl. No. 09/408,972 Office Action mailed Jan. 23, 2004.

U.S. Appl. No. 09/408,972 Final Office Action mailed Nov. 15, 2002.

U.S. Appl. No. 09/408,972 Office Action mailed Feb. 26, 2002.

U.S. Appl. No. 11/295,676 Final Office Action mailed Apr. 17, 2007.

U.S. Appl. No. 12/121,941 Final Office Action mailed Mar. 13, 2012.

U.S. Appl. No. 12/121,941 Office Action mailed Mar. 3, 2011.

\* cited by examiner

NETWORK TOPOLOGY FOR A SCALABLE MULTIPROCESSOR SYSTEM

CROSS-REFERENCE TO RELATED APPLICATIONS

The present application is a continuation and claims the priority benefit of U.S. patent application Ser. No. 12/121,941 filed May 16, 2008, which is a continuation and claims the priority benefit of U.S. patent application Ser. No. 11/295,676 filed Dec. 6, 2005, which is a continuation and claims the priority benefit of U.S. patent application Ser. No. 09/408,972 filed Sep. 29, 1999, now U.S. Pat. No. 6,973,559, the disclosure of which is incorporated herein by reference.

BACKGROUND OF THE INVENTION

Field of the Invention

The present invention relates generally to the field of high-speed digital data processing systems, and more particularly, to interconnection topologies for interconnecting processing element nodes in multiprocessor computer systems.

Description of the Related Art

Multiprocessor computer systems comprise a number of processing element nodes connected together by an interconnect network. Each processing element node includes at least one processing element. The interconnect network transmits packets of information or messages between processing element nodes. Multiprocessor computer systems having up to hundreds or thousands of processing element nodes are typically referred to as massively parallel processing (MPP) systems. In a typical multiprocessor MPP system, every processing element can directly address all of memory, including the memory of another (remote) processing element, without involving the processor at that processing element. Instead of treating processing element-to-remote-memory communications as an I/O operation, reads or writes to another processing element's memory are accomplished in the same manner as reads or writes to the local memory. In such multiprocessor MPP systems, the infrastructure that supports communications among the various processors greatly affects the performance of the MPP system because of the level of communications required among processors.

Several different topologies have been proposed to interconnect the various processors in such MPP systems, such as rings, stars, meshes, hypercubes, and torus topologies. For example, in a conventional hypercube network, a plurality of microprocessors are arranged in an n-dimensional cube where the number of nodes k in the network is equal to 2'. In this network, each node is connected to each other node via a plurality of communications paths. The network diameter, the longest communications path from any one node on the network to any other node, is n-links.

Regardless of the topology chosen, one disadvantage of current multiprocessor systems, and in particular MPP systems, is that in order to expand the system, a significant amount of reconfiguration is required. The reconfiguration often involves removing and replacing cables which is very time consuming. Also, as systems increase the number of processors, the number of physical connections required to support the system increases significantly which increases the complexity of the system.

Therefore, it is desired that systems could be easily scaled to increase the number of processors with minimal disruption to the original system configuration.

SUMMARY OF THE PRESENTLY CLAIMED INVENTION

The present invention provides a system and method for interconnecting a plurality of processing element nodes within a scalable multiprocessor system. Each processing element node includes at least one processor and memory. A scalable interconnect network includes physical communication links interconnecting the processing element nodes in a cluster. A first set of routers in the scalable interconnect network route messages between the plurality of processing element nodes. One or more metarouters in the scalable interconnect network route messages between the first set of routers so that each one of the routers in a first cluster is connected to all other clusters through one or more metarouters.

DETAILED DESCRIPTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

System Overview

Figure 1:
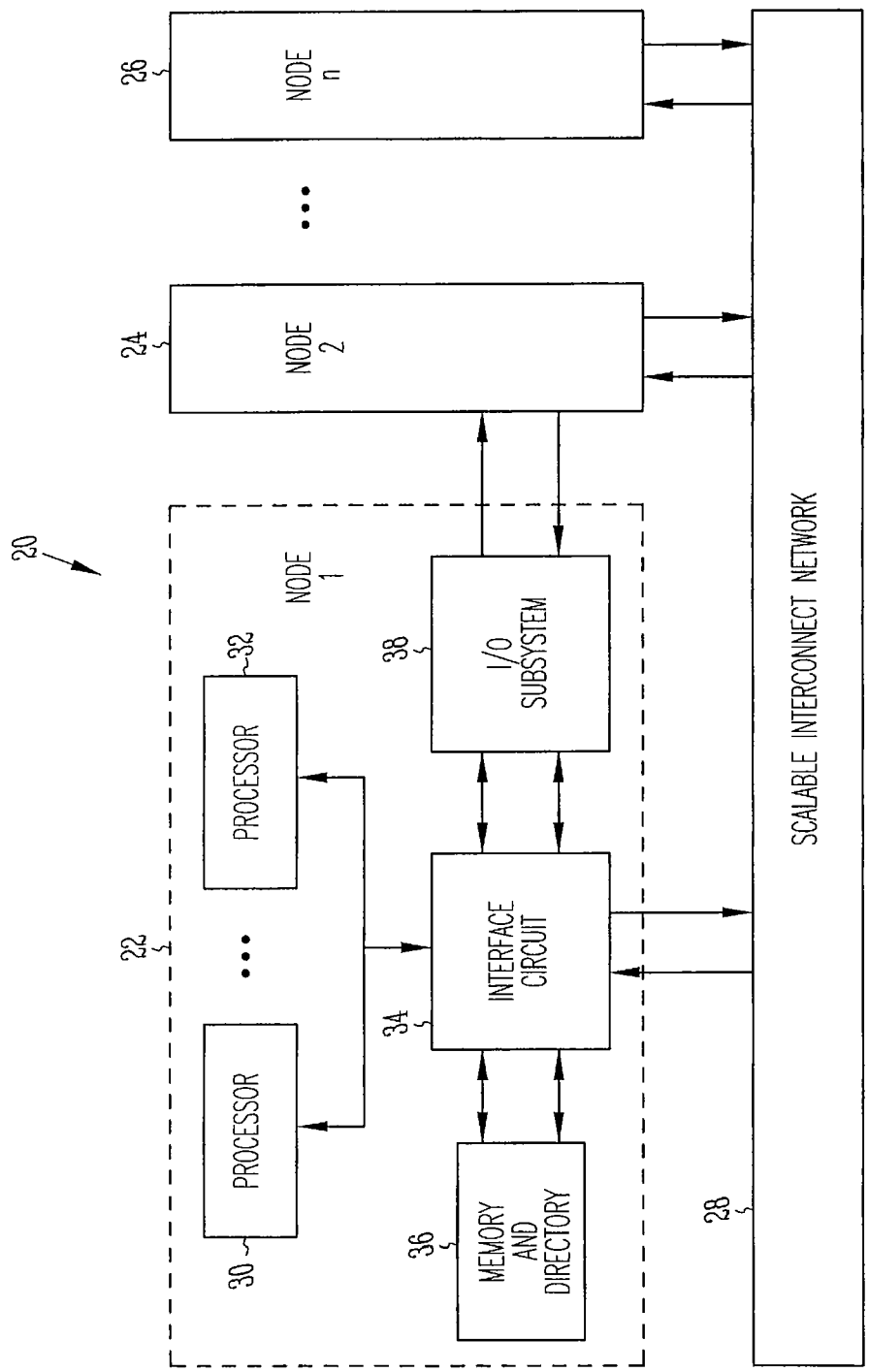
FIG. 1 is block diagram of a multiprocessor computer system.

A representative multiprocessor computer system according to the present invention is indicated generally at 20 in FIG. 1. As indicated in FIG. 1, multiprocessor computer system 20 includes up to n nodes, such as indicated by a first node 22, a second node 24, and an nth node 26. The nodes are interconnected by a scalable interconnect network 28, which permits multiprocessor computer systems 20 to be scaled from desk side systems to very large supercomputer configurations.

As illustrated in detail for first node 22, each node in multiprocessor computer system 20 includes at least one processor, such as a first processor 30 and a second processor 32 for node 22. An interface circuit 34 interfaces with scalable interconnect network 28 and communicates with a memory and directory 36 and an input/output subsystem 38.

Although the multiprocessor computer system 20 illustrated in FIG. 1 provides one example environment to implement the below-described network topology according to the present invention, the present invention is in no way limited to this particular application environment. In fact, many alternative environments using alternative node and interface circuit configurations can be utilized. To a large extent, the network topology according to the present invention, as implemented in scalable interconnect network 28, is independent of the complexity of the nodes, such as nodes 22, 24, and 26, interconnected by that topology.

Figure 2:
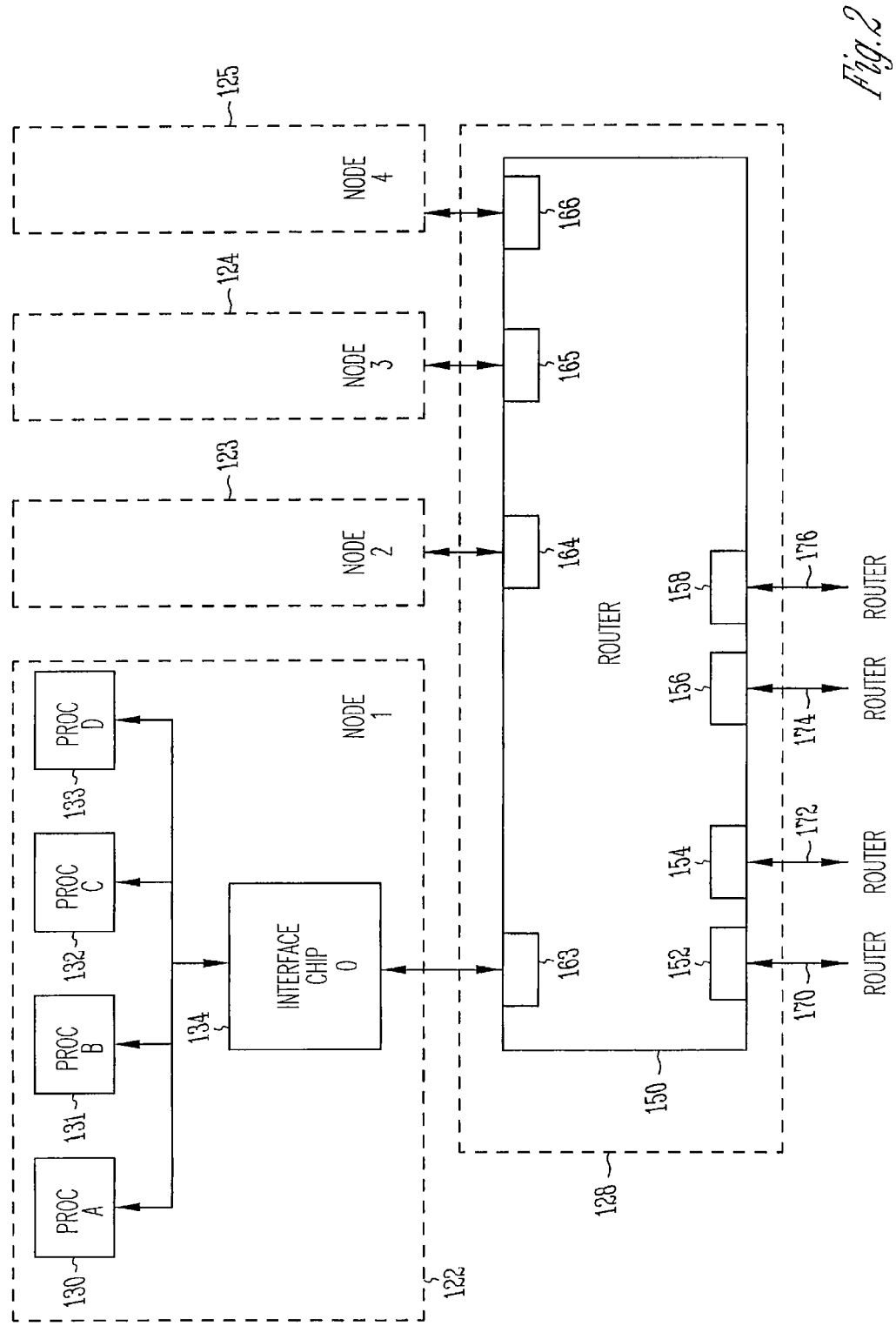
FIG. 2 is a block diagram of one embodiment of the interface between a scalable interconnect network and four processing element nodes.

FIG. 2 illustrates, in block diagram form, one embodiment of the interface between a scalable interconnect network 128 and four nodes 122, 123, 124, and 125. In this embodiment, scalable interconnect network 128 includes one or more routers, such as the example router 150 shown in FIG. 2. Router port 163 communicates with a first node 122. As shown in the expanded view of the first node 122, router port 163 communicates with the first node 122 via interface chip 134. In the first node 122, interface chip 134 communicates with processors 130, 131, 132, and 133. Similarly, router port 164 communicates with a second node 123, router port 165 communicates with a third node 124, and router port 166 communicates with a fourth node 125. Router ports 152, 154, 156, and 158 communicate with other routers in the scalable interconnect network 128 as further described below. In the example embodiment illustrated in FIG. 2, one router 150 communicates directly with up to sixteen processors and up to four other routers in the scalable interconnect network 128.

The scalable interconnect network 128 of the present invention employs a first set of routers (such as router 150 of FIG. 2) for routing messages between a plurality of processing element nodes (such as nodes 122, 123, 124, and 125 in FIG. 2). In one embodiment of the present invention, four of the eight ports of each one of the first set of routers are dedicated to connecting from the routers to four separate nodes, such as indicated in FIG. 2. As further described below, the remaining ports are connected to the first set of routers for routing messages between the nodes and a second set of routers (referred to herein as "metarouters") for routing messages between the first set of routers. In one embodiment, the metarouters shown in FIGS. 5-16 below are multiport routers having at least four ports. One of skill in the art will recognize that a single multiport router or any combination of multiport routers can be used in the configurations shown in FIGS. 5-16.

As will be better understood by the following discussion, the topology of a scalable interconnect network according to the present invention, is easily scaleable, has increased resiliency and allows system upgrades/expansion to be performed with minimal disruption to the system.

Example Network Topologies. A grouping of a plurality of processing element nodes, a plurality of physical interconnections (such as cables) for connecting the plurality of processing element nodes, and a first set of routers for routing messages between a plurality of processing element nodes is referred to herein as a "cluster." In a multiprocessing system of the present invention, each cluster is connected to each one of the other clusters using one or more metarouters. Thus, each one of the clusters can communicate directly with another one of the clusters without having to communicate through a third cluster.

Figure 3:
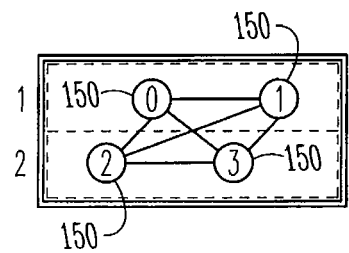
FIG. 3 is a model of a two dimensional (2D) hypercube topology multiprocessor computer system.

In one embodiment, the processing element nodes and first set of routers form one or more two-dimensional hypercube systems. An example two dimensional (2D) hypercube topology multiprocessor computer system is shown in FIG. 3. In FIG. 3, the four routers 150 are numbered 0 through 3 and are interconnected as a 2D hypercube. In one embodiment, the 2D hypercube comprises up to sixty-four processors because each of the four routers communicates with up to sixteen processors as shown in FIG. 2. In the following detailed description clusters are configured in a two-dimensional hypercube for illustrative purposes only. The invention is not limited to arranging the first set of routers in a two-dimensional hypercube. Alternate embodiments in which the first set of routers are grouped in different topologies are contemplated as within the scope of the invention.

Figure 4:
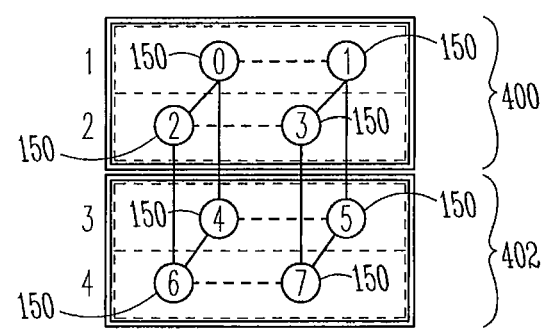
FIG. 4 is a model of a three dimensional (3D) hypercube topology multiprocessor computer system.

In one embodiment, a multiprocessor computer system is constructed with up to 128 processors without the use of metarouters. Such an embodiment is shown in FIG. 4. in which a first cluster 400 and a second cluster 402 are each arranged as two-dimensional hypercubes. As shown in FIG. 4, the routers of a first cluster 400 and a second cluster 402 are interconnected to form a three-dimensional (3D) hypercube. The 3D hypercube is comprised of eight routers 150 numbered 0 through 7. In an example embodiment, each one of the routers is an eight port router connected to four processing element nodes such as the router shown in FIG. 2. For processing element nodes having four processors each, the 3D hypercube interconnects up to 128 processors.

Larger scale system configurations and the corresponding logical topologies for example systems having 128 or more processors are described below. The larger scale systems employ a second set of routers (referred to herein as "metarouters") to interconnect the clusters. The novel network topologies of the present invention allow two clusters to communicate directly without having to route messages through a third cluster. Rather than routing messages through a third cluster, the routers in each cluster are connected to all other clusters through the metarouters.

As shown in FIGS. 5-16, each router is either connected directly to a router of another cluster or is connected to a router of another cluster using one or more metarouters. In the example embodiments shown in FIGS. 5-16, the connections from a single router in one cluster to routers in all other clusters are represented by particular line styles. The dashed lines in FIGS. 5-16 represent the connections from a first router in a first cluster to a single router in each one of the other clusters. The solid lines in FIGS. 5-16 represent the connections from a second router in the first cluster to a second router in each one of the other clusters. The dotted lines in FIGS. 5-16 represent the connections from a third router in the first cluster to a third router in each one of the other clusters. The dash/dot lines in FIGS. 5-16 represent the connection from a fourth router in a first cluster to a fourth router in each one of the other clusters.

Figure 5:
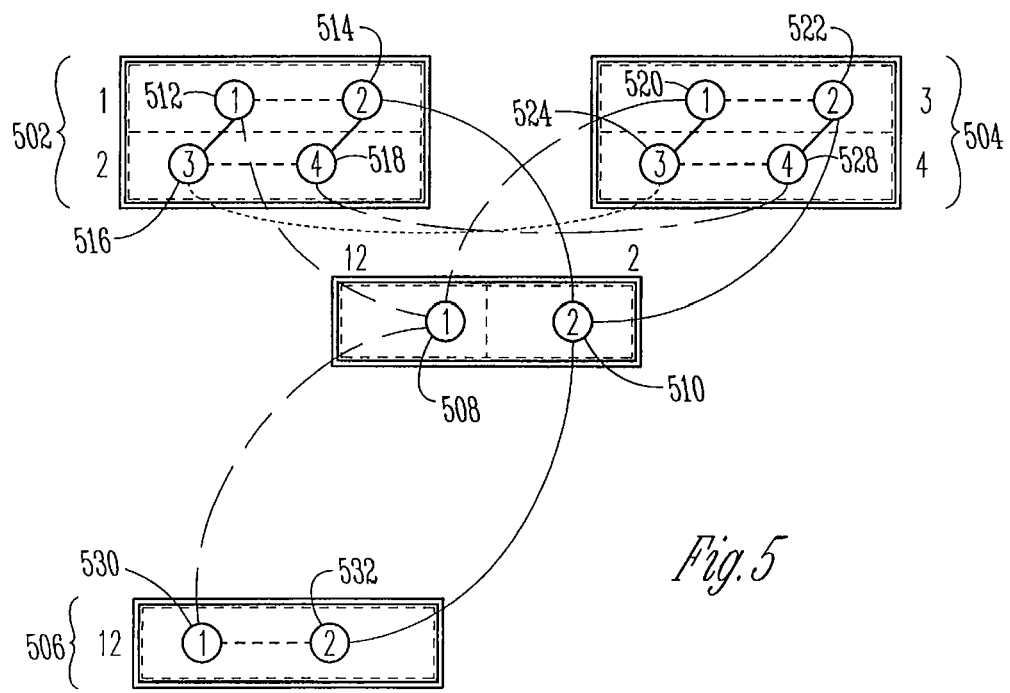
FIG. 5 illustrates an example embodiment of a logical topology used for multiprocessor computer systems having 129 processors to 160 processors.

FIG. 5 illustrates an example embodiment of a logical topology used for systems having 129 processors to 160 processors. The logical topology comprises three clusters 502, 504, 506 interconnected with two metarouters 508, 510. In an alternate embodiment, a single multipart metarouter is used instead of the two metarouters 508, 510. In the example embodiment, a first cluster 502 comprises sixty-four processors and the second cluster 504 also comprises sixty-four processors. The third cluster 506 can include any number of processors from one to thirty-two making a total of 129 to 160 processors in the multiprocessor computer system shown in FIG. 5.

A router in each one of the three clusters 502, 504, 506 is connected to another router in each one of the other three clusters 502, 504, 506 through the metarouters 508, 510. Dashed lines represent the connection between a first router in a first cluster and a single router in each one of the other clusters. The first router 512 in a first cluster 502 is connected to a first router 520 in a second cluster 504 through a metarouter 508. The first router 512 in the first cluster 502 is also connected to a first router 530 in a third cluster 506 through the metarouter 508.

Likewise, the solid lines represent the connection between a second router in the first cluster with a second router in each one of the other clusters. The second router 514 in the first cluster 502 is connected to a second router 522 in the second cluster 504 through a metarouter 510. The second router 514 in the first cluster 502 is also connected to a second router 532 in third cluster 506 through metarouter 510.

Similarly, the dotted lines represent the connection between a third router in the first cluster with a third router in each one of the other clusters and dash/dot lines in the diagrams represent the connection between a fourth router in the first cluster with a fourth router in each one of the other clusters. The third router 516 and the fourth router 518 in the first cluster 502 are directly connected to a third router 524 and a fourth router 528 in the second cluster 504. The third cluster 506 lacks a third router and a fourth router in this configuration. Thus, as shown in FIG. 5, each one of the routers in a cluster communicates with a router in each of the other clusters through either a direct connection or through one or more metarouters. This eliminates the dependency of one cluster to communicate with another cluster through a third cluster and thus creates a more resilient system. The topologies of the present invention allow clusters to communicate directly with each other without communicating through a third cluster.

Figure 6:
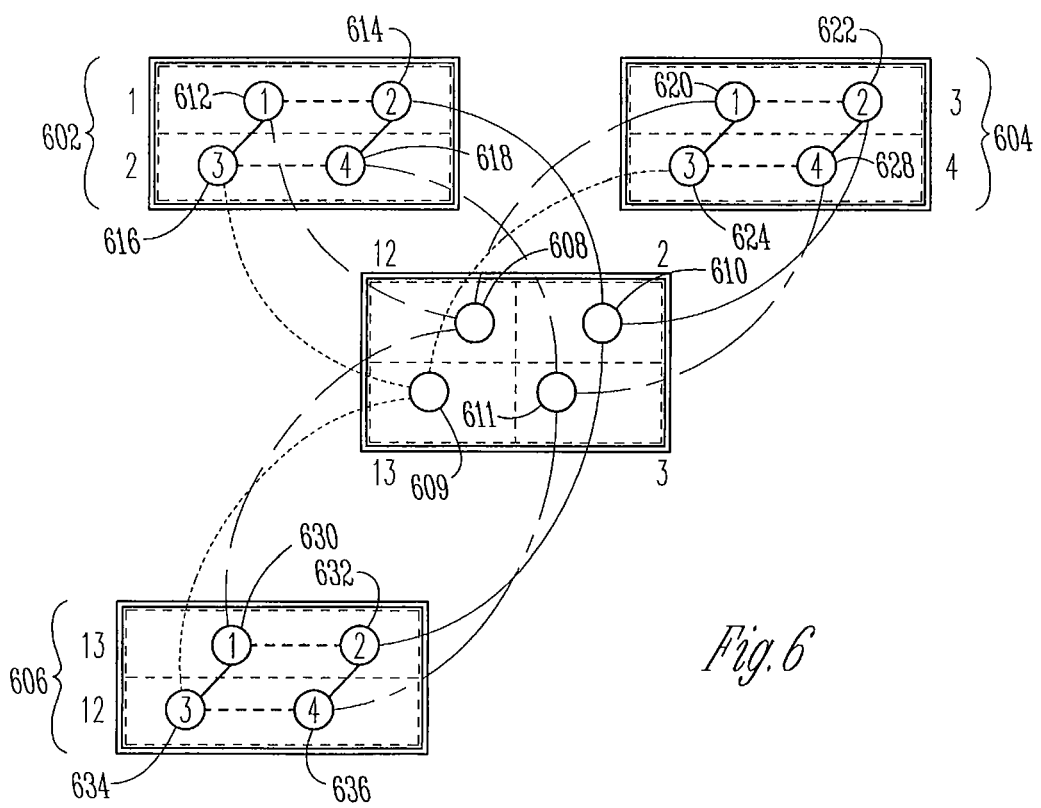
FIG. 6 illustrates an example embodiment of a logical topology used for multiprocessor computer systems having 161 processors to 192 processors.

FIG. 6 illustrates an example embodiment of a logical topology used for multiprocessor computer systems having 161 processors to 192 processors. The logical topology comprises three clusters 602, 604, 606 interconnected with four metarouters 608, 609, 610, and 611. In an alternate embodiment, two multiport metarouters are used in place of the four metarouters 608, 609, 610 and 611. In the example embodiment shown in FIG. 6, a first cluster 602 comprises sixty-four processors and a second cluster 604 also comprises sixty-four processors. A third cluster 606 can include any number of processors from thirty-three processors to sixty-four processors for a total of 161 to 192 processors in the multiprocessor computer system shown in FIG. 6.

A router in each one of the three clusters 602, 604, 606 is connected to another router in each one of the other three clusters 602, 604, 606 through the metarouters 608, 609, 610 and 611. The first router 612 in a first cluster 602 is connected to a first router 620 in a second cluster 604 through a metarouter 608. The first router 612 in the first cluster 602 is also connected to a first router 630 in a third cluster 606 through the metarouter 608. Connections between the first router 612 in the first cluster 602 and each one of the other clusters are represented in FIG. 6 with dashed lines.

Likewise, the second router 614 in the first cluster 602 is connected to a second router 622 in the second cluster 604 through a metarouter 610. The second router 614 in the first cluster 602 is also connected to a second router 632 in third cluster 606 through metarouter 610. Connections between the second router 614 in the first cluster 602 and each one of the other clusters are represented in FIG. 6 with solid lines. Similarly, the dotted lines in FIG. 6 represent the connections between a third router 616 in the first cluster 602 and each one of the other clusters. The third router 616 in the first cluster 602 is connected to a third router 624 in the second cluster 604 through metarouter 609. The third router 616 in the first cluster 602 is also connected to a third router 634 in the third cluster 606 through metarouter 609. Additionally, the dash/dot lines in FIG. 6 represent the connections between a fourth router 618 in the first cluster 602 and each one of the other clusters. The fourth router 618 in the first cluster 602 is connected to a fourth router 628 in the second cluster 604 through metarouter 611. The fourth router 618 in the first cluster 602 is also connected to a fourth router 636 in the third cluster 606 through metarouter 611. Thus, as shown in FIG. 6, each one of the routers in a cluster communicates with a router in each of the other clusters through metarouters.

Figure 7:
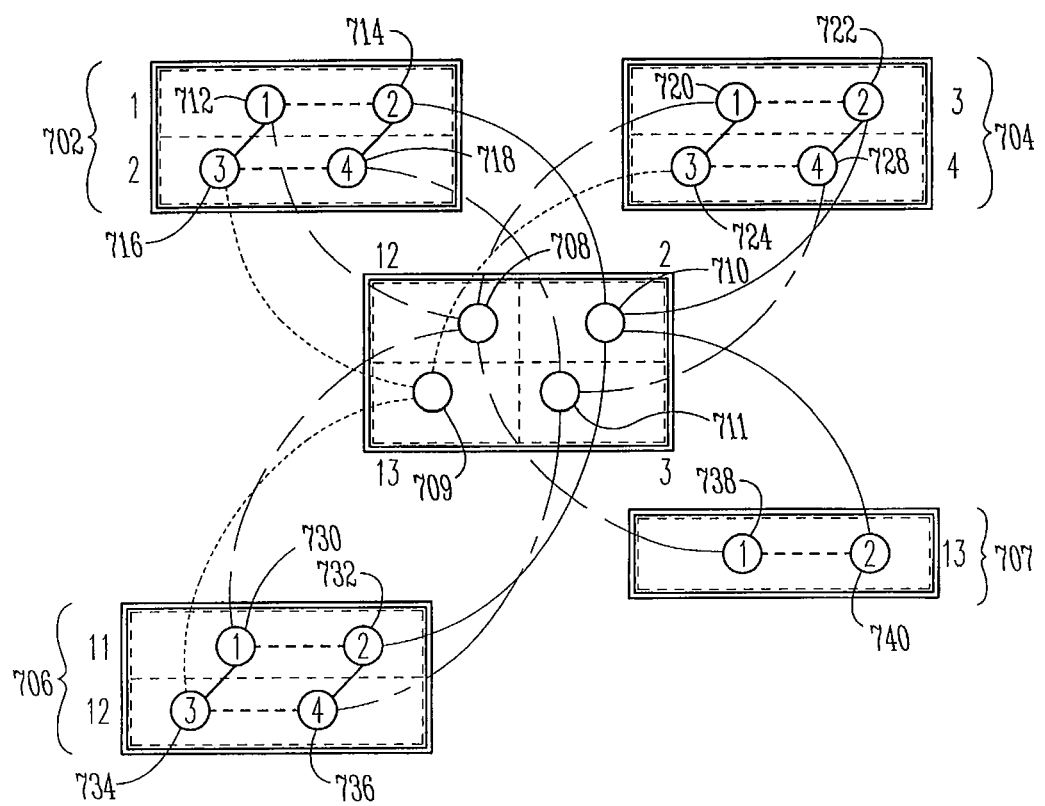
FIG. 7 illustrates an example embodiment of a logical topology used for multiprocessor computer systems having 193 processors to 224 processors.

FIG. 7 illustrates an example embodiment of a logical topology used for multiprocessor computer systems having 193 processors to 224 processors. The logical topology comprises four clusters 702, 704, 706, 707 interconnected with four metarouters 708, 709, 710, and 711. In an alternate embodiment, two multiport metarouters are used in place of the four metarouters 708, 709, 710, and 711. In the example embodiment shown in FIG. 7, a first cluster 702, a second cluster 704, and a third cluster 706 each comprise sixty-four processors. A fourth cluster 707 includes any number of processors from one processor up to thirty-two processors for a total of 193 to 224 processors in the multiprocessor computer system shown in FIG. 7.

A router in each one of the four clusters 702, 704, 706, 707 is connected to another router in each one of the other four clusters 702, 704, 706, 707 through one of the metarouters 708, 709, 710 and 711. Connections between the first router 712 in the first cluster 702 and each one of the other clusters are represented in FIG. 7 with dashed lines. The first router 712 in a first cluster 702 is connected to a first router 720 in a second cluster 704 through a metarouter 708. The first router 712 in the first cluster 702 is also connected to a first router 730 in a third cluster 706 through the metarouter 708. In addition, as shown in FIG. 7, the first router 712 in the first cluster 702 is connected to a first router 738 in a fourth cluster 707 through the metarouter 708.

Connections between the second router 714 in the first cluster 702 and each one of the other clusters are represented in FIG. 7 with solid lines. The second router 714 in the first cluster 702 is connected to a second router 722 in the second cluster 704 through a metarouter 710. The second router 714 in the first cluster 702 is also connected to a second router 732 in third cluster 706 through metarouter 710 Additionally, in FIG. 7 the second router 714 in the first cluster 702 is connected to a second router 740 in a fourth cluster 707 through the metarouter 708.

Similarly, the dotted lines in FIG. 7 represent the connections between a third router 716 in the first cluster 702 and each one of the other clusters. The third router 716 in the first cluster 702 is connected to a third router 724 in the second cluster 704 through metarouter 709. The third router 716 in the first cluster 702 is also connected to a third router 734 in the third cluster 706 through metarouter 709. Likewise, the dash/dot lines in FIG. 7 represent the connections between a fourth router 718 in the first cluster 702 and each one of the other clusters. The fourth router 710 in the first cluster 702 is connected to a fourth router 728 in the second cluster 704 through metarouter 711. The fourth router 710 in the first cluster 702 is also connected to a fourth router 736 in the third cluster 706 through metarouter 711.

Thus, as shown in FIG. 7, each one of the routers in a cluster communicates with a router in each of the other clusters through metarouters. Furthermore, the 224 processor system shown in FIG. 7 is easily created by expanding the 192 processor system shown in FIG. 6. First, the multiprocessor system of FIG. 7 is formed by adding the fourth cluster 707. Second, the interconnections are added from the metarouter 708 to a first router 738 in the fourth cluster 707. Third, the interconnections are added from the metarouter 710 to the second router 740 in a fourth cluster 707. Thus, a 192 processor system of the present invention is expandable to a 224 processor system without having to recable the first, the second, and the third clusters 702, 704, 706 to expand the configuration.

Figure 8:
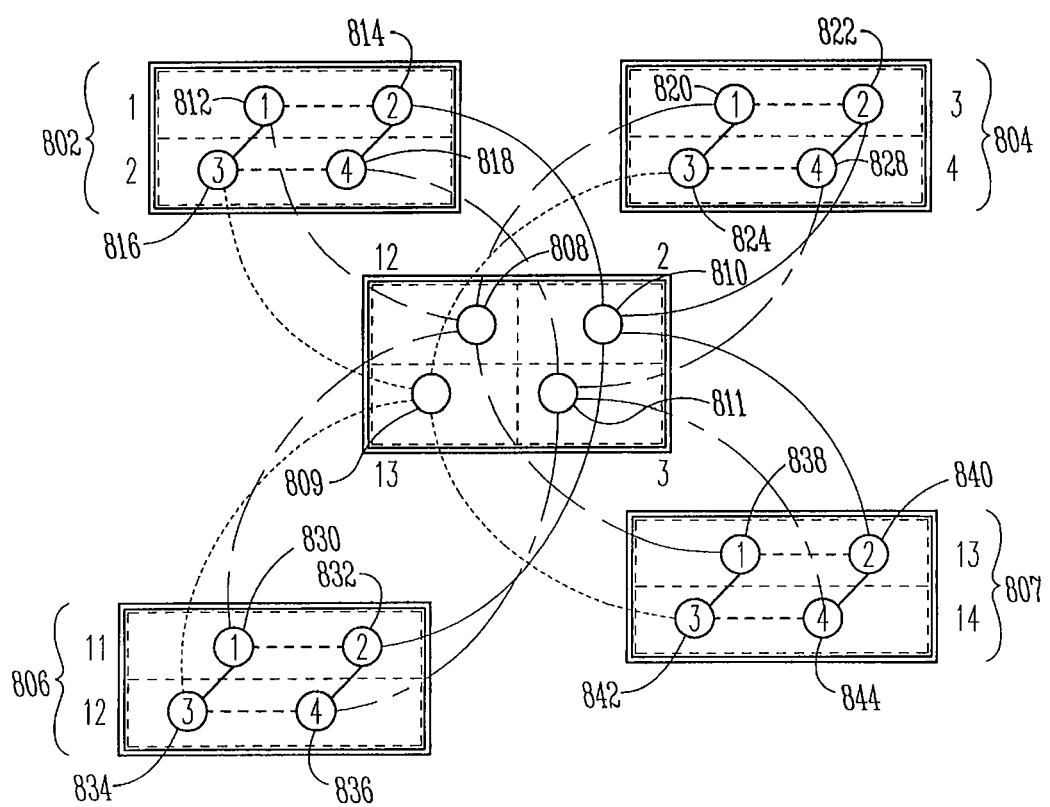
FIG. 8 illustrates an example embodiment of a logical topology used for multiprocessor computer systems having 225 processors to 256 processors.

FIG. 8 illustrates an example embodiment of a logical topology used for multiprocessor computer systems having 225 processors to 256 processors. The logical topology comprises four clusters 802, 804, 806, 807 interconnected with four metarouters 808, 809, 810, and 811. In the example embodiment shown in FIG. 8, a first cluster 802, a second cluster 804, and a third cluster 806 each contain sixty-four processors. In addition, the fourth cluster 807 can include from thirty-three processors up to sixty-four processors for a total of 225 to 256 processors in the multiprocessor computer system shown in FIG. 8.

A router in each one of the four clusters 802, 804, 806, 807 is connected to another router in each one of the other four clusters 802, 804, 806, 807 through one of the metarouters 808, 809, 810 and 811. Connections between the first router 812 in the first cluster 802 and each one of the other clusters are represented in FIG. 8 with dashed lines. The first router 812 in a first cluster 802 is connected to a first router 820 in a second cluster 804 through a metarouter 808. The first router 812 in the first cluster 802 is also connected to a first router 830 in a third cluster 806 through the metarouter 808. The first router 812 in the first cluster 802 is also connected to a first router 838 in a fourth cluster 807 through the metarouter 808.

Connections between the second router 814 in the first cluster 802 and each one of the other clusters are represented in FIG. 8 with solid lines. The second router 814 in the first cluster 802 is connected to a second router 822 in the second cluster 804 through a metarouter 810. The second router 814 in the first cluster 802 is also connected to a second router 832 in third cluster 806 through metarouter 810, and the second router 814 in the first cluster 802 is connected to a second router 840 in a fourth cluster 807 through the metarouter 808.

Similarly, the dotted lines in FIG. 8 represent the connections between a third router 816 in the first cluster 802 and each one of the other clusters. The third router 816 in the first cluster 802 is connected to a third router 824 in the second cluster 804 through metarouter 809. The third router 816 in the first cluster 802 is also connected to a third router 834 in the third cluster 806 through metarouter 809. Additionally, the 224 processor system of FIG. 7 is expanded in FIG. 8 by adding a processing element node and a third router 842 in the fourth cluster 807 and connecting the third router 816 in the first cluster 802 to the third router 842 in the fourth cluster 807 through metarouter 809.

Likewise, the dash/dot lines in FIG. 8 represent the connections between a fourth router 818 in the first cluster 802 and each one of the other clusters. The fourth router 818 in the first cluster 802 is connected to a fourth router 828 in the second cluster 804 through metarouter 811. The fourth router 818 in the first cluster 802 is also connected to a fourth router 836 in the third cluster 806 through metarouter 811. Additionally, the 224 processor system of FIG. 7 is further expanded in FIG. 8 by adding a processing element node and a fourth router 844 and connecting the fourth router 818 in the first cluster 802 to the fourth router 844 in the fourth cluster 807 through metarouter 811.

Again, as shown in FIG. 8, each one of the routers in a cluster communicates with a router in each of the other clusters through metarouters. Furthermore, the 256 processor system shown in FIG. 8 is easily created by expanding the 224 processor system shown in FIG. 7. Thus, a 224 processor system of the present invention is expandable to a 256 processor system merely by adding processing element nodes, interconnections, and routers to the fourth cluster 807. The expansion of the system does not require reconfiguration or recabling the first, the second, or the third clusters 702, 704, 706 in FIG. 7.

FIGS. 9-16 illustrate example embodiments of multiprocessor systems having greater than 256 processors. The multiprocessor systems shown in FIGS. 9-16 are built by expanding the configuration shown in FIG. 8 comprising up to 256 processors. The 256 processor system shown in FIG. 8 has four clusters configured as 2D hypercubes and interconnected with metarouters. According to the present invention, multiprocessor systems having more than 256 processors are configured by adding clusters to the configuration shown in FIG. 8 and connecting each one of the clusters to the other clusters in the configuration by one or more metarouters.

Figure 9:
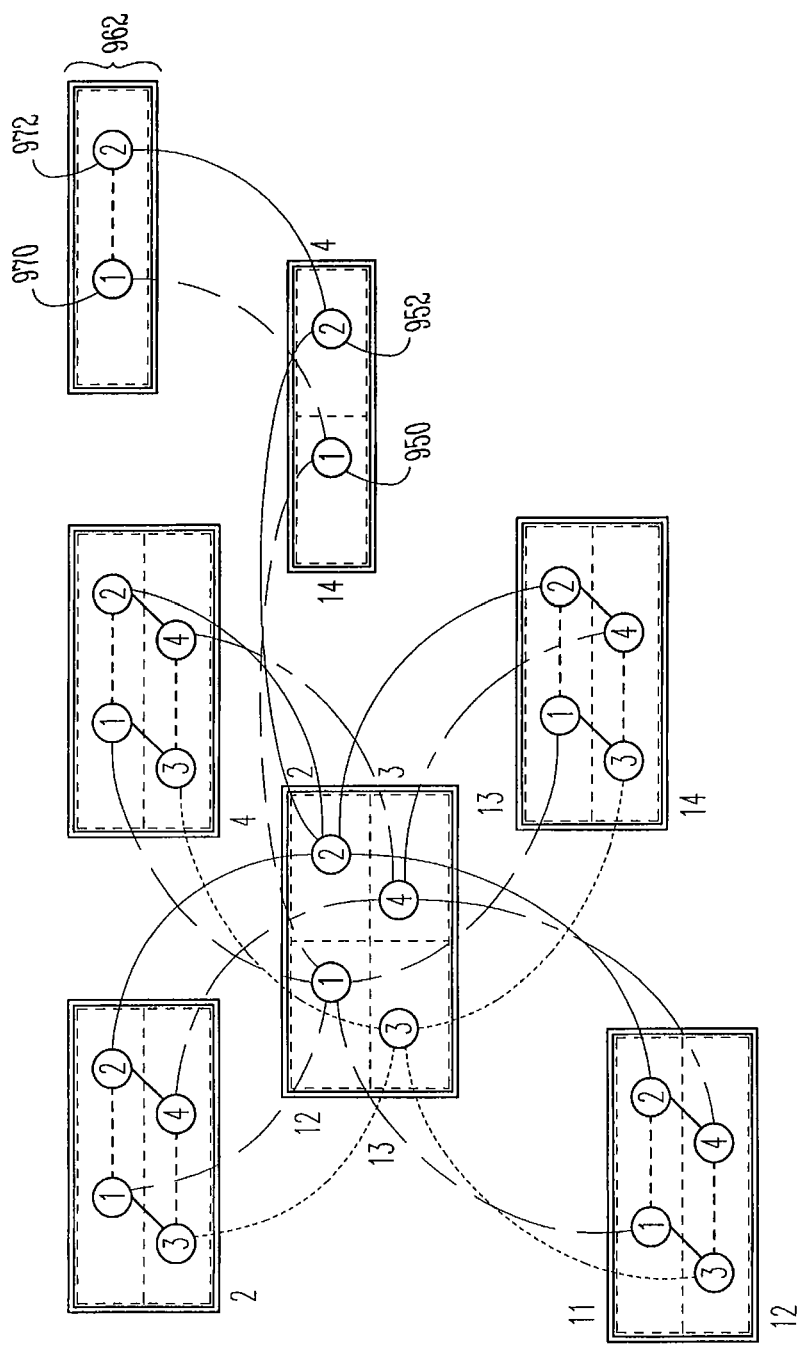
FIG. 9 illustrates an example embodiment of a logical topology used for multiprocessor computer systems having up to 288 processors.

FIG. 9 illustrates an example embodiment of a logical topology used for multiprocessor computer systems having up to 288 processors. The 288 processor system shown in FIG. 9 is easily created by expanding the 256 processor system shown in FIG. 8. A fifth cluster 962 is added to the multiprocessor system and two additional metarouters 950, 952 are added to the multiprocessor system. Interconnections are added from the metarouter 950 to a first router 970 in the fifth cluster 962, and to another metarouter. Interconnections are also added from the metarouter 952 to a second router 972 in the fifth cluster 962, and to another metarouter. Thus, a 256 processor system of the present invention is easily expandable to a 288 processor system without having to reconfigure the original 256 processor system.

Figure 10:
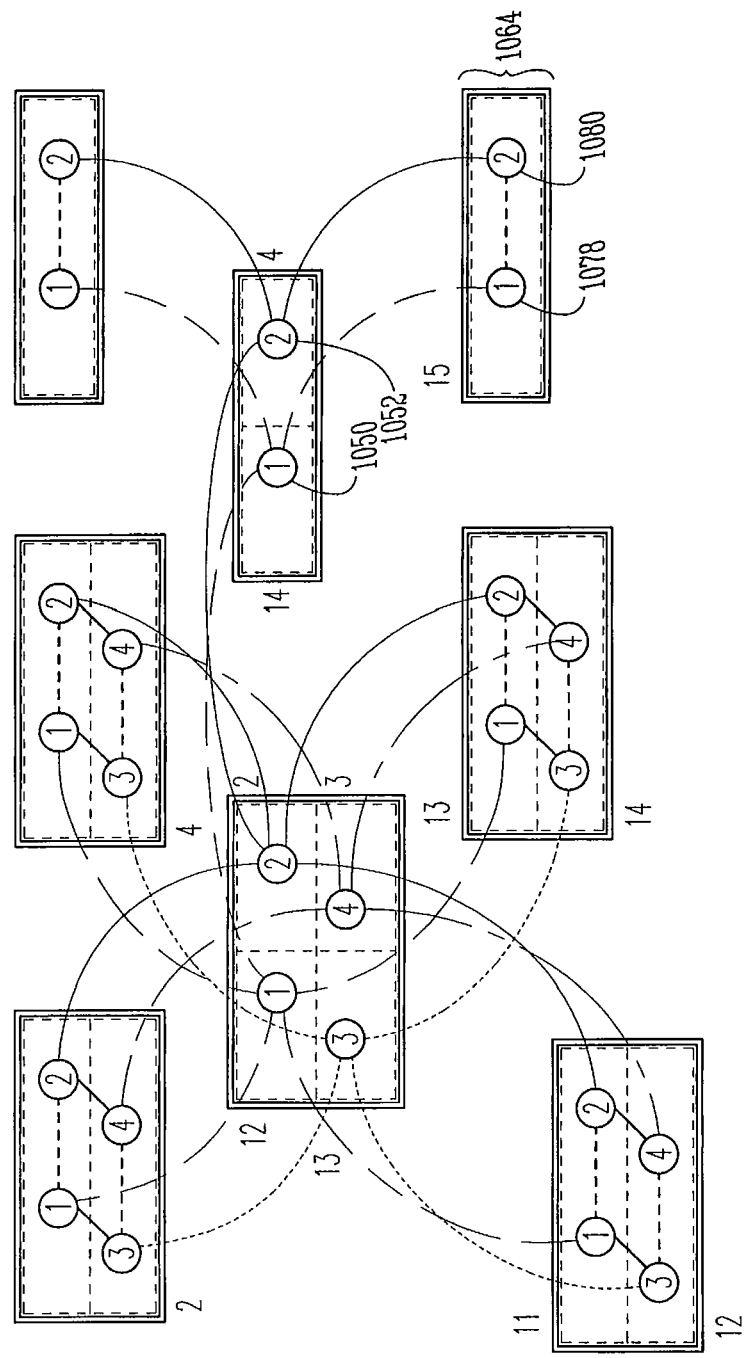
FIG. 10 illustrates an example embodiment of a logical topology used for multiprocessor computer systems having up to 320 processors.

FIG. 10 illustrates an example embodiment of a logical topology used for multiprocessor computer systems having up to 320 processors. The 320 processor system shown in FIG. 10 is easily created by expanding the 288 processor system shown in FIG. 9. A sixth cluster 1064 is added to the multiprocessor system. Interconnections are added from the metarouter 1050 to a first router 1078 in the sixth cluster 1064. Interconnections are also added from the metarouter 1052 to a second router 1080 in the sixth cluster 1064. As shown in FIG. 10, a 288 processor system of the present invention is easily expandable to a 320 processor system without having to reconfigure the original 288 processor system.

Figure 11:
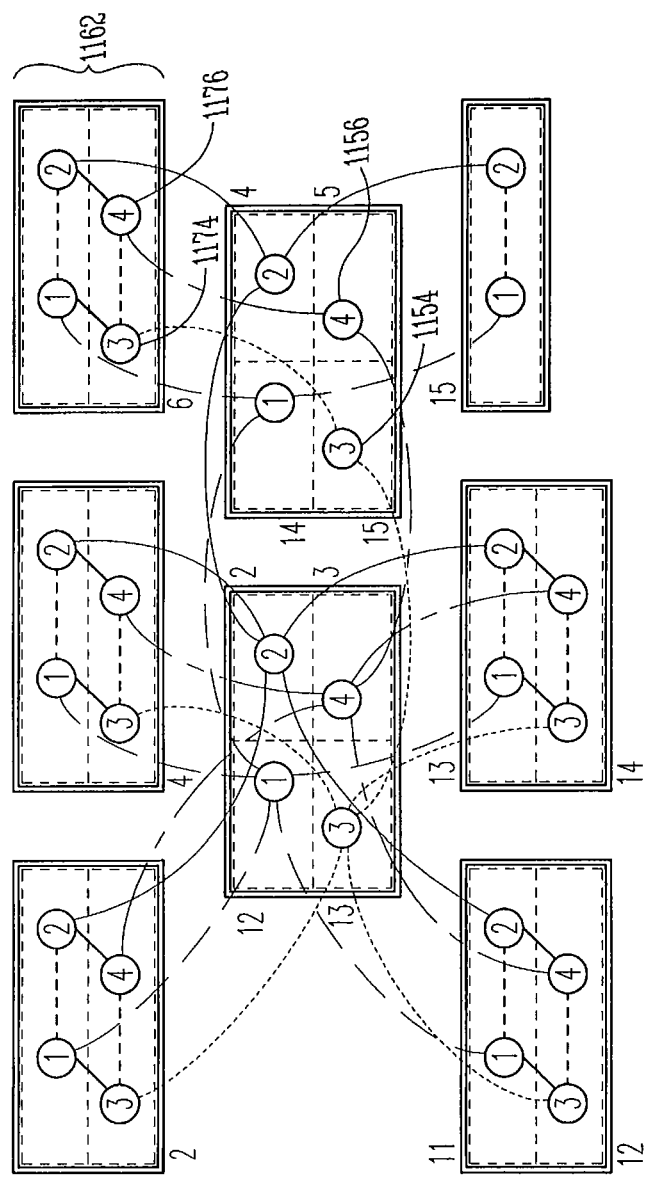
FIG. 11 illustrates an example embodiment of a logical topology used for multiprocessor computer systems having up to 352 processors.

FIG. 11 illustrates an example embodiment of a logical topology used for multiprocessor computer systems having up to 352 processors. The 352 processor system shown in FIG. 11 is easily created by expanding the 320 processor system shown in FIG. 10. A third router 1174 (and a corresponding processor element node) and a fourth router 1176 (and a corresponding processor element node) are added to the fifth cluster 1162 of the multiprocessor system. Interconnections are added from the metarouter 1154 (which is also added to the multiprocessor system) to the third router 1174 in the fifth cluster 1162. Interconnections are also added from the metarouter 1156 (which is also added to the system) to the fourth router 1176 in the fifth cluster 1162. The new metarouters 1154, 1156 are also interconnected to the previous metarouters. As shown in FIG. 11, a 320 processor system of the present invention is easily expandable to a 352 processor system without having to reconfigure the original 320 processor system.

Figure 12:
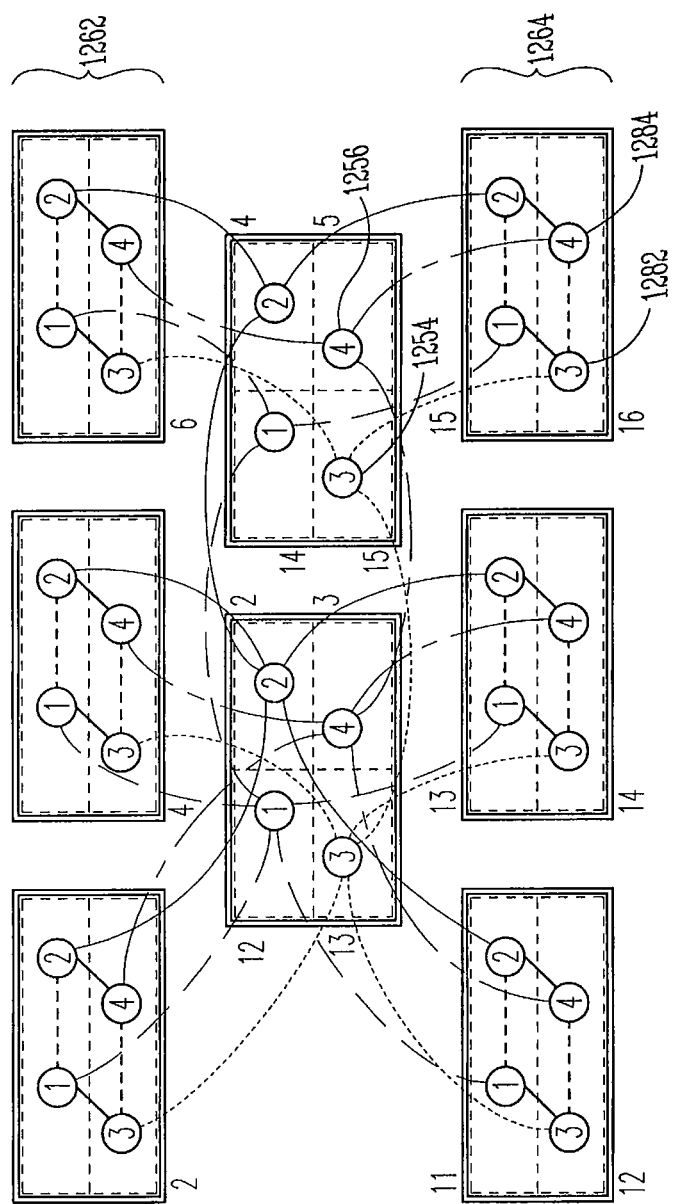
FIG. 12 illustrates an example embodiment of a logical topology used for multiprocessor computer systems having up to 384 processors.

FIG. 12 illustrates an example embodiment of a logical topology used for multiprocessor computer systems having up to 384 processors. The 384 processor system shown in FIG. 12 is easily created by expanding the 352 processor system shown in FIG. 11. A third router 1282 and a fourth router 1284 and the corresponding processing element nodes are added to the sixth cluster 1264 of the multiprocessor system. Interconnections are added from the metarouter 1254 to the third router 1282 in the sixth cluster 1264. Interconnections are also added from the metarouter 1256 to the fourth router 1284 in the sixth cluster 1264. As shown in FIG. 12, a 352 processor system of the present invention is easily expandable to a 384 processor system without having to reconfigure the original 352 processor system.

Figure 13:
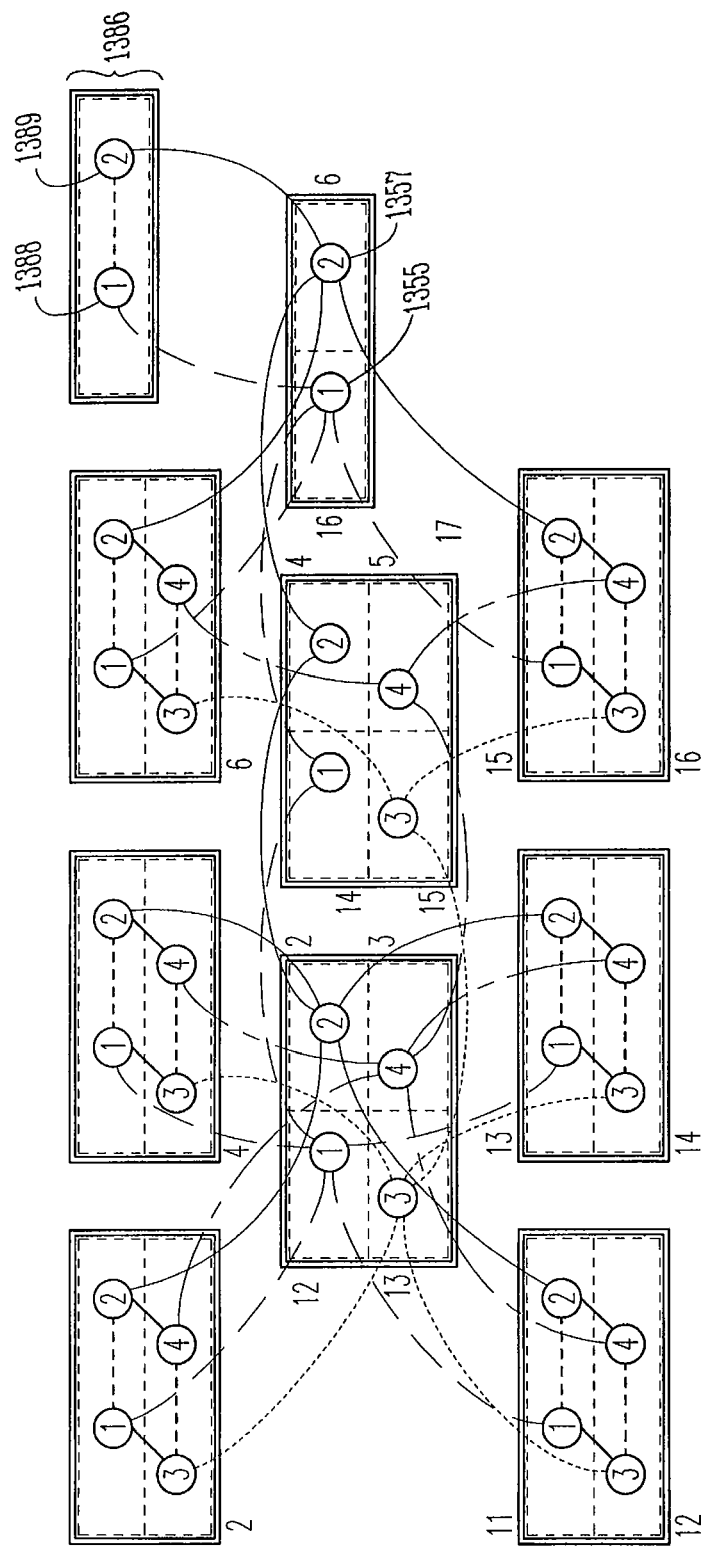
FIG. 13 illustrates an example embodiment of a logical topology used for multiprocessor computer systems having up to 416 processors.

FIG. 13 illustrates an example embodiment of a logical topology used for multiprocessor computer systems having up to 416 processors. The 416 processor system shown in FIG. 13 is easily created by expanding the 384 processor system shown in FIG. 12. A seventh cluster 1386 having a first router 1388 and a second router 1389 are added to the multiprocessor system. Two metarouters 1355, 1357 are also added. Interconnections are added from the metarouter 1355 to the first router 1388 in the seventh cluster 1386 and to one of the metarouters. Interconnections are also added from the metarouter 1357 to the second router 1389 in the seventh cluster 1386 and to one of the other metarouters. As shown in FIG. 13, a 384 processor system of the present invention is easily expandable to a 416 processor system without having to reconfigure the original 384 processor system.

Figure 14:
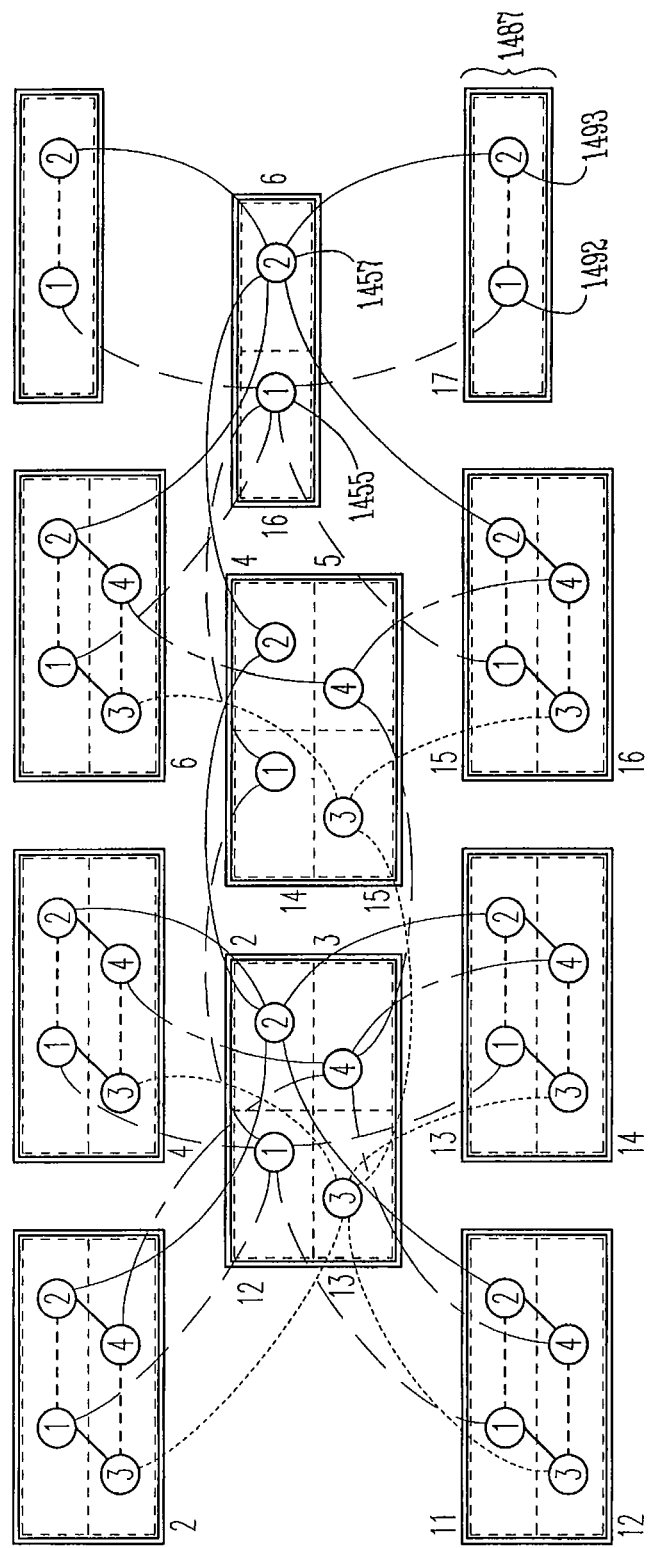
FIG. 14 illustrates an example embodiment of a logical topology used for multiprocessor computer systems having up to 448 processors.

FIG. 14 illustrates an example embodiment of a logical topology used for multiprocessor computer systems having up to 448 processors. The 448 processor system shown in FIG. 14 is easily created by expanding the 416 processor system shown in FIG. 13. An eighth cluster 1487 having a first router 1492 (and corresponding processing element node) and a second router 1493 (and corresponding processing element node) are added to the multiprocessor system. Interconnections are added from the metarouter 1455 to the first router 1492 in the eighth cluster 1487. Interconnections are also added from the metarouter 1457 to the second router 1493 in the eighth cluster 1487. As shown in FIG. 14, a 416 processor system of the present invention is easily expandable to a 448 processor system without having to reconfigure the original 416 processor system.

Figure 15:
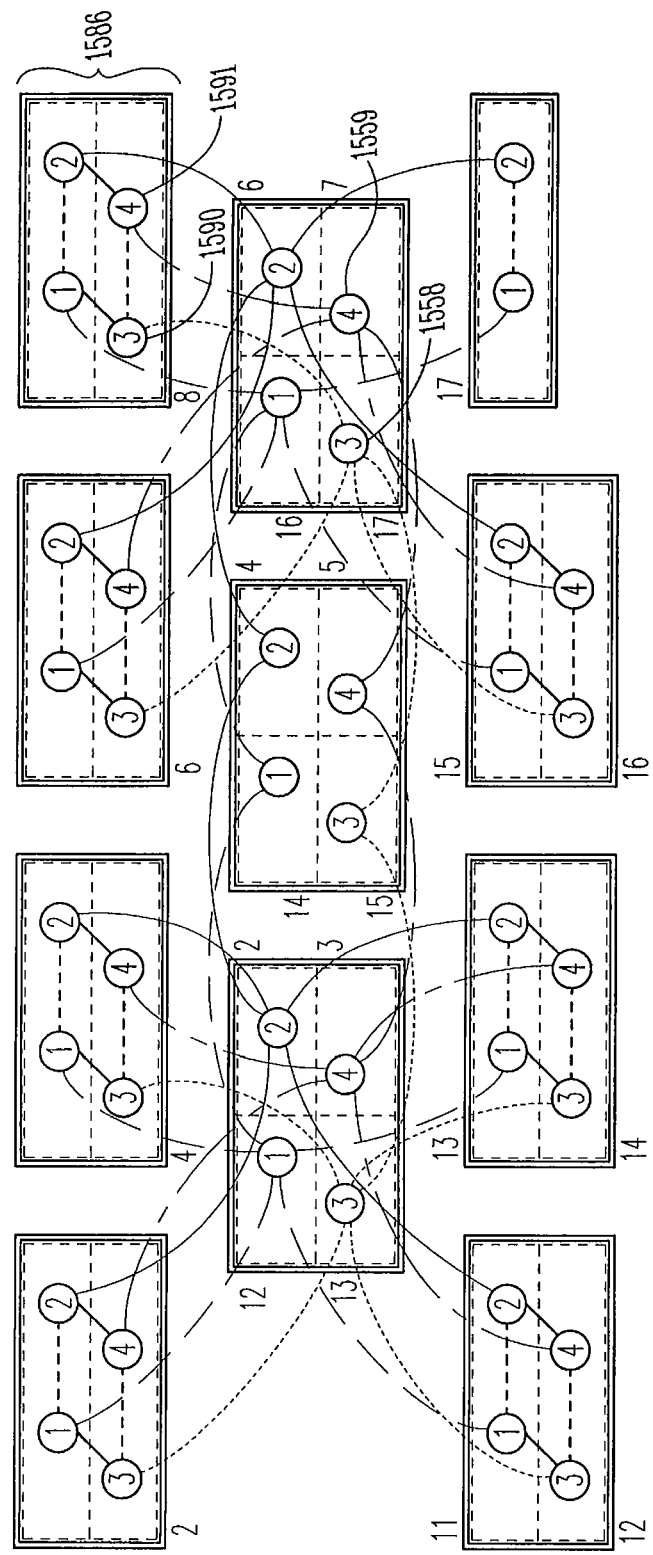
FIG. 15 illustrates an example embodiment of a logical topology used for multiprocessor computer systems having up to 480 processors.

FIG. 15 illustrates an example embodiment of a logical topology used for multiprocessor computer systems having up to 480 processors. The 480 processor system shown in FIG. 15 is easily created by expanding the 448 processor system shown in FIG. 14. A third router 1590 and a fourth router 1591 are added the seventh cluster 1586 of the multiprocessor system. Two metarouters are also added 1558, 1559 and interconnections are added from the two metarouters 1558, 1559 to another metarouter. Interconnections are added from the metarouter 1558 to the third router 1590 in the seventh cluster 1586. Interconnections are also added from the metarouter 1559 to the fourth router 1591 in the seventh cluster 1586. As shown in FIG. 15, a 448 processor system of the present invention is easily expandable to a 480 processor system without having to reconfigure the original 448 processor system.

Figure 16:
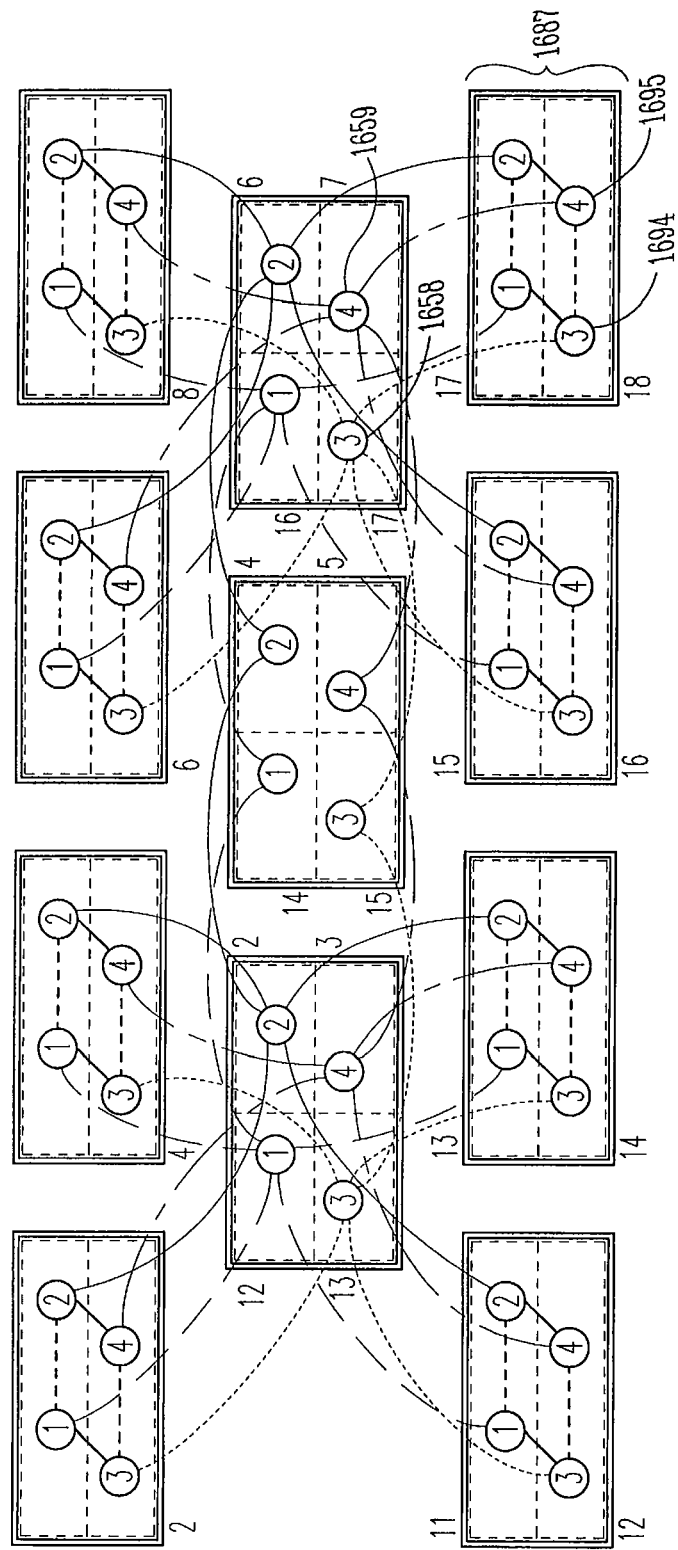
FIG. 16 illustrates an example embodiment of a logical topology used for multiprocessor computer systems having up to 512 processors.

FIG. 16 illustrates an example embodiment of a logical topology used for multiprocessor computer systems having up to 512 processors. The 512 processor system shown in FIG. 16 is easily created by expanding the 480 processor system shown in FIG. 15. A third router 1694 (and a corresponding processing element node) and a fourth router 1695 (and a corresponding processing element node) are added the eighth cluster 1687 of the multiprocessor system. Interconnections are added from the metarouter 1658 to the third router 1694 in the eighth cluster 1687. Interconnections are also added from the metarouter 1659 to the fourth router 1695 in the eighth cluster 1687. As shown in FIG. 16, a 480 processor system of the present invention is easily expandable to a 512 processor system without having to reconfigure the original 480 processor system.

Figure 17:
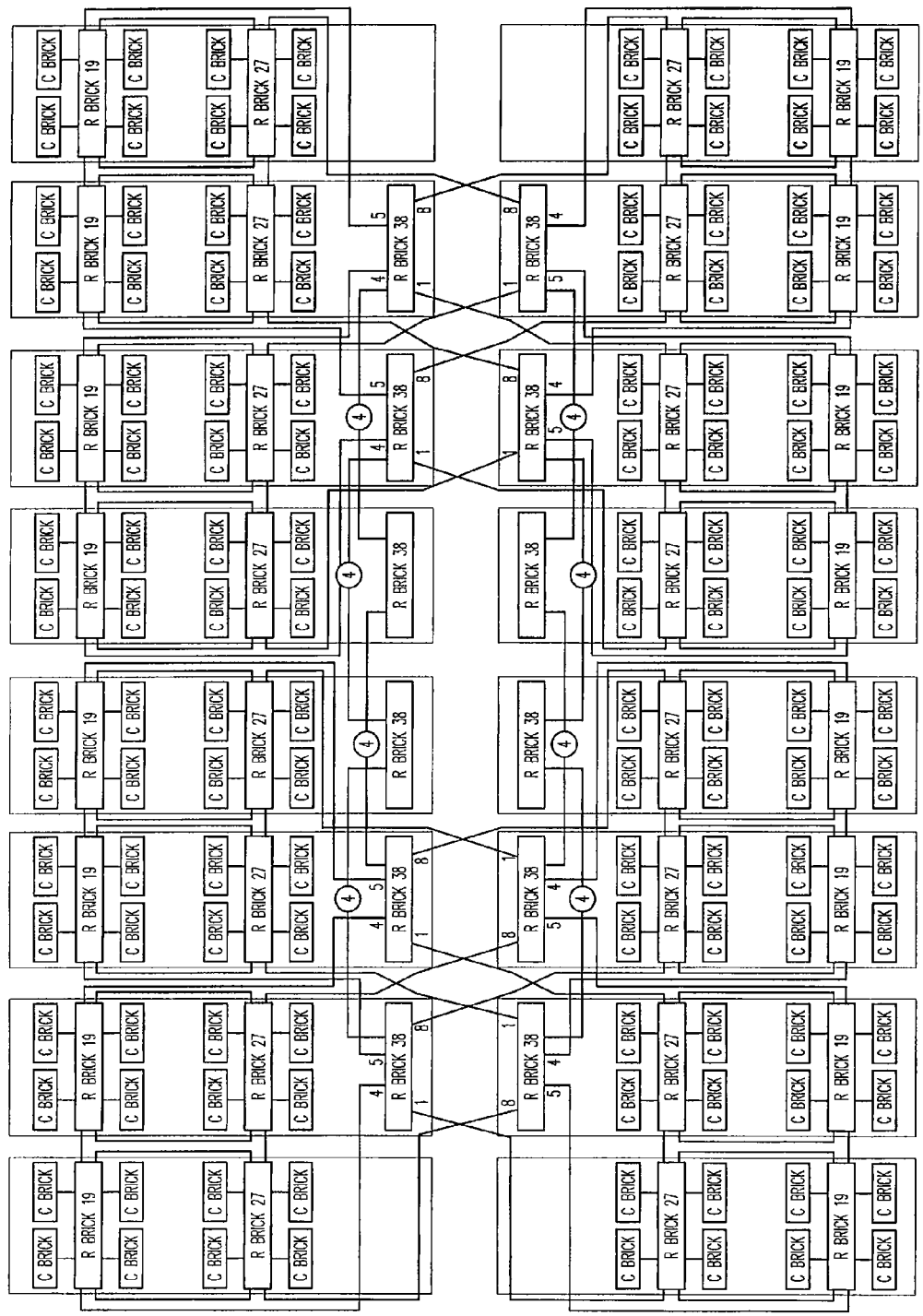
FIG. 17 illustrates an example embodiment of a multiprocessor computer system having 512 processors.

FIG. 17 illustrates an example embodiment of a system according to FIG. 16. Each router (19, 27) is connected to four compute nodes (Cbricks). The remaining four ports are connected to other routers. Router 38 provides between routers, routers 27 and other routers 38.

The present invention, as described above, permits smaller systems to be expanded to larger systems with minimal disruption to the original system configuration. Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodi-

What is claimed is:

1. A parallel processing system, comprising:
a plurality of clusters, including at least a first cluster, a second cluster, and a third cluster, wherein each cluster of the plurality of clusters includes:
a plurality of processing element nodes, each of the plurality of nodes including at least one processor, and
a first set of routers for interconnecting the plurality of processing element nodes in each cluster of the plurality of clusters; and
a second set of routers for interconnecting each of the clusters of the plurality of clusters, wherein:
a first message from a node in the first cluster is routed to the third cluster through a router of the second set of routers without being routed to the second cluster when the first message addresses a node in the third cluster,
a second message from a node of the plurality of nodes in the second cluster is routed to the third cluster through the router or through another router of the second set of routers without being routed through the first cluster when the second message addresses the node or another node in the third cluster.

2. The parallel processing system of claim 1, wherein a router in each of the plurality of clusters has a direct connection to a router in at least one other cluster in the plurality of clusters.

3. The parallel processing system of claim 1, wherein a router of the first set of routers in each of the plurality of clusters is connected via a router in the second set of routers to a router in at least one other cluster of the plurality of clusters.

4. The parallel processing system of claim 1, wherein each of the clusters is a two-dimensional hypercube.

5. The parallel processing system of claim 1, wherein each of the clusters is a three-dimensional hypercube.

6. The parallel processing system of claim 1, wherein each router in the second set of routers is an eight port router.

7. The parallel processing system of claim 1, wherein each router in the second set of routers is a four port router.

8. The parallel processing system of claim 1, wherein the plurality of processing element nodes include four processors.

9. The parallel processing system of claim 1, wherein the plurality of clusters and second set of routers form a scalable network, wherein the clusters include n-dimensional hypercube that remain intact as additional processing elements nodes are added to the scalable network.

10. A method for providing parallel processing in a plurality of clusters including at least a first cluster, a second cluster, and a third cluster, wherein each cluster of the plurality of clusters includes a plurality of processing element nodes and a first set of routers, the method comprising:
interconnecting a plurality of nodes in each cluster of the plurality of clusters by way of the first set of routers;
interconnecting each of the clusters of the plurality of clusters by way of the second set of routers; and
connecting each of the plurality of clusters, such that each of the plurality of nodes in each respective cluster of the plurality of clusters are connected through a router of the first set of routers in each respective cluster, and each of the clusters of the plurality of clusters are connected by at least one router of the second set of routers,
routing a first message from a node in the first cluster to the third cluster through a router of the second set of routers without being routed to the second cluster when the first message addresses a node in the third cluster,
routing a second message from a node of the plurality of nodes in the second cluster to the third cluster through the router or through another router of the second set of routers without being routed through the first cluster when the second message addresses the node or another node in the third cluster.

11. The method of claim 10, further comprising establishing a direct connection by a router in each of the plurality of clusters to a router in at least one other cluster of the plurality of clusters.

12. The method of claim 10, wherein at least one router of the first set of routers in each of the plurality of clusters is connected to a router in each of the other clusters of the plurality of clusters via a router in the second set of routers.

13. The method of claim 10, further comprising wherein each of the clusters is a two dimensional hypercube.

14. The method of claim 10, further comprising wherein each of the clusters is a three dimensional hypercube.

15. The method of claim 10, further comprising adding additional processing elements nodes to a scalable network, wherein the plurality of clusters and second set of routers form the scalable network, wherein the clusters include n-dimensional hypercube that remain intact as the additional processing elements nodes are added to the scalable network.

16. The method of claim 10, wherein each router in the second set of routers is an eight port router.

17. The method of claim 10, wherein each router in the second set of routers is a four port router.

18. The method of claim 10, wherein the plurality of processing element nodes include four processors.

* * * * *